(12) United States Patent
Conway et al.

(10) Patent No.: US 9,471,587 B2
(45) Date of Patent: Oct. 18, 2016

(54) REMOTE ENUMERATION OF A DIRECTORY

(71) Applicant: Apple Inc., Cupertino, CA (US)

(72) Inventors: William C. Conway, San Jose, CA (US); George K. Colley, Sunnyvale, CA (US); Bradley R. M. Suinn, Fort Collins, CO (US); Christopher N. Ryan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 477 days.

(21) Appl. No.: 13/913,229

(22) Filed: Jun. 7, 2013

(65) Prior Publication Data

US 2014/0365540 A1 Dec. 11, 2014

(51) Int. Cl.
*G06F 17/30* (2006.01)

(52) U.S. Cl.
CPC .................... *G06F 17/30165* (2013.01)

(58) Field of Classification Search
CPC ................................................ G06F 17/30165
USPC .......................................................... 707/827
See application file for complete search history.

(56) References Cited

U.S. PATENT DOCUMENTS

| | | | | |
|---|---|---|---|---|
| 5,218,697 A | * | 6/1993 | Chung | H04L 29/06 707/E17.006 |
| 9,323,624 B2 | * | 4/2016 | Miyoshi | G06F 3/0617 707/654 |
| 2002/0078174 A1 | * | 6/2002 | Sim | G06F 17/30194 709/219 |
| 2002/0083118 A1 | * | 6/2002 | Sim | G06F 17/30194 718/105 |
| 2004/0250113 A1 | * | 12/2004 | Beck | H04L 63/12 726/27 |
| 2014/0136485 A1 | * | 5/2014 | Miyoshi | G06F 3/0617 707/654 |
| 2014/0215212 A1 | * | 7/2014 | Dempster | G06F 21/6245 713/168 |

* cited by examiner

*Primary Examiner* — Phong Nguyen
(74) *Attorney, Agent, or Firm* — Sterne, Kessler, Goldstein & Fox P.L.L.C.

(57) ABSTRACT

When enumerating of a set of content items in a directory in a remote file server, an electronic device provides a request for information associated with the set of content items. The electronic device and the file server may use, respectively, use an OS X®-based operating system and a Windows®-based operating system. In response to the request, the file server may access information specifying the set of content items. For example, the information may include maximal access information and finder information for each content item in the set of content items in the directory. Next, the electronic device may receive a response with the requested information from the file server. The providing of the request and the receiving of the response may, respectively, involve single instances of a request and a response, thereby significantly reducing the amount of communication between the electronic device and the file server.

20 Claims, 4 Drawing Sheets

REMOTE ENUMERATION OF A DIRECTORY

BACKGROUND

1. Field

The described embodiments relate to techniques for remotely accessing content items. More specifically, the described embodiments relate to techniques for accessing content items in a file server from another computer when the file server and the other computer use different operating systems.

2. Related Art

Network protocols that facilitate remote access to resources (such as shared printers) and content items (such as files, folders and directories) stored on servers are becoming increasingly popular. These network protocols are typically implemented in an application layer for process-to-process communication in networks, and typically leverage an underlying transport layer protocol (such as Transmission Control Protocol/Internet Protocol) to provide connections.

However, the capabilities of many network protocols are often restricted. For example, a Server Message Block (SMB) protocol (such as the SMB 2.x protocol or the SMB 3.x protocol) provided by Microsoft Corporation of Redmond, Wash., is typically restricted with connections between computers and servers that are compatible with an operating system provided by Microsoft Corporation (such as Windows®). These restrictions can be frustrating to users, and can also degrade communication performance.

SUMMARY

The disclosed embodiments relate to a network protocol that allows remote access to a file server from another computer. The computer and the file server may use the same or different operating systems. For example, the computer may use an operating system provided by Apple Inc. of Cupertino, Calif., and the file server may use an operating system provided by Microsoft Corporation of Redmond, Wash. In this example, the network protocol may modify a Server Message Block (SMB) protocol (such as the SMB 2.x protocol) provided by Microsoft Corporation to allow the computer to efficiently perform commands that, for example, perform the following operations: server query (to request variable information from the file server), query directory extension (to obtain metadata associated with a set of content items during an enumeration of a directory), resolve identifier (to identify a content item that matches a content-item identifier), copy file (to copy data and metadata associated with a content item to a new content item), and/or server message notifications (to indicate that the file server is going to be shut down and, more generally, that the file server will change state).

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
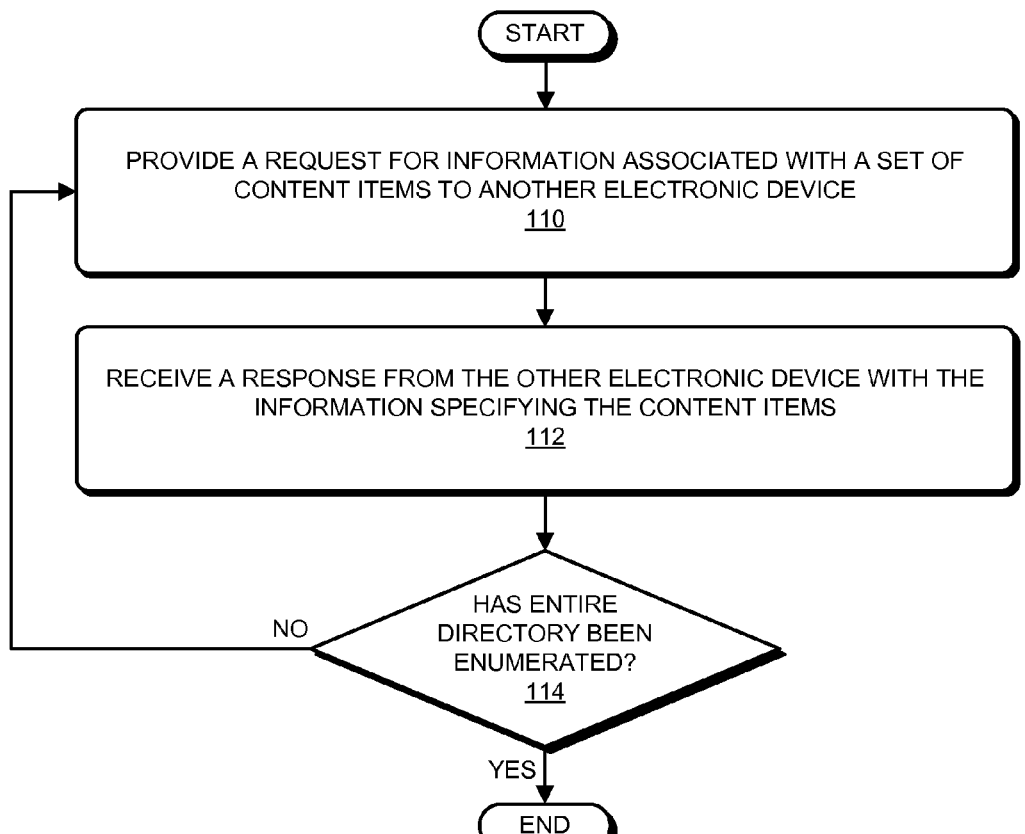
FIG. 1 is a flow diagram illustrating a method for enumerating a directory that includes a set of content items located in another electronic device in accordance with described embodiments.

Table 1 provides pseudocode in accordance with described embodiments.

Table 2 provides pseudocode in accordance with described embodiments.

Table 3 provides pseudocode in accordance with described embodiments.

Table 4 provides pseudocode in accordance with described embodiments.

Table 5 provides pseudocode in accordance with described embodiments.

Table 6 provides pseudocode in accordance with described embodiments.

Note that like reference numerals refer to corresponding parts throughout the drawings. Moreover, multiple instances of the same part are designated by a common prefix separated from an instance number by a dash.

DETAILED DESCRIPTION

A network protocol to facilitate remote access to content items on a file server from a computer when the computer and the file server use the same or different operating systems is described. While this network protocol is broadly applicable, in the discussion that follows the network protocol is used to modify or to extend a Server Message Block (SMB) protocol (such as the SMB 2.x protocol, the SMB 3.x protocol or an SMB protocol that has not yet been specified) provided by Microsoft Corporation of Redmond, Wash. In the discussion that follows, a modified SMB 2.x protocol is used as an example. The modified SMB 2.x protocol facilitates communication between: a computer executing an operating system provided by Apple Inc. of Cupertino, Calif. (such as OS X®) and a file server executing an operating system provided by Microsoft Corporation (such as Windows®); a computer executing an operating system provided by Microsoft Corporation and a file server executing an operating system provided by Apple Inc.; a computer executing an operating system provided by Apple Inc. and a file server executing an operating system provided by Apple Inc.; a computer executing an operating system provided by Microsoft Corporation and a file server executing an operating system provided by Microsoft Corporation; or a computer executing a Linux operating system and a file server executing an operating system provided by Microsoft Corporation. More generally, network protocol may be used to facilitate remote access by a computer executing an arbitrary operating system (such as: the ONTAP operating system from NetApp of Sunnyvale, Calif.; the Solaris operating system from Oracle Corporation of Redwood Shores, Calif.; and embedded operating systems in printers and network-attached-storage boxes) with a file server executing the same or another arbitrary operating system.

This capability may allow remote users to access and use the content items stored on the file server. Moreover, the network protocol may provide improved performance and additional functionality that would not otherwise be supported by the SMB 2.x protocol. For example, using the modified SMB 2.x protocol, the computer may be able to perform a variety of commands, such as: a server query (to request variable information from the file server), a query directory extension command (to obtain metadata associated with a set of content items during an enumeration of a directory), a resolve identifier command (to identify a content item that matches a content-item identifier), a copy file command (to copy data and metadata associated with a content item to a new content item located on the same file server), and/or a server message notification command (to indicate that the file server is going to be shut down and, more generally, to indicate that the file server will change state).

As an illustration, we describe a method for performing the query directory extension command. FIG. 1 presents a flow diagram illustrating a method 100 for enumerating a directory that includes a set of content items (such as one or more files and/or one or more directories) located in another electronic device (such as file server), which may be performed by an electronic device (such as a computer or electronic device 400 in FIG. 4) that executes an operating system, such as an operating system provided by Apple Inc. (which is used as an illustrative example). During the method, the electronic device provides a request for information associated with the set of content items to the other electronic device (operation 110). In particular, the requested information may enumerate the directory. The request may be a compound request that includes: a create request, a query information request and a close request.

Then, the electronic device receives a response from the other electronic device with information specifying the set of content items (operation 112) and enumerating the specified directory. For example, the information may include maximal access information (i.e., a summary of the access rights and privileges, regardless of category from which they are obtained, which are granted to a user that is currently logged in to the file server) and finder information (i.e., information that specifies a hierarchical arrangement of content items in a directory, such as that associated with a Finder application in an operating system provided by Apple Inc., File Explorer in an operating system provided by Microsoft Corporation, Nautilus in a Gnome file manager, etc.) for each content item in the set of content items in the directory. The finder information may be conveyed in file-identifier-both-directory-information reply fields (and, more generally, in arbitrary fields). Note that providing the request (operation 110) may involve providing a single instance of a request to the other electronic device, and receiving the response (operation 112) may involve receiving a single instance of a response from the other electronic device. Using the network protocol, no additional requests need to be sent to the other electronic device to complete the enumeration of the directory. Thus, the network protocol may avoid the multiple requests and responses that are typically needed to enumerate a directory using existing network protocols.

Moreover, the set of content items may include a file and the response may include a resource fork logical length associated with the file (which is sometimes referred to as 'file-stream information'). The resource fork logical length may also be conveyed in the file-identifier-both-directory-information reply fields (and, more generally, in an arbitrary field).

The electronic device may determine whether the entire directory has been enumerated (operation 114). In particular, if the response does not include a special error code, the entire directory has not been enumerated, and the providing (operation 110) and the receiving (operation 112) are repeated. Alternatively, if the response includes the special error code, the entire directory has been enumerated, and the providing (operation 110) and the receiving (operation 112) are not repeated.

Figure 2:
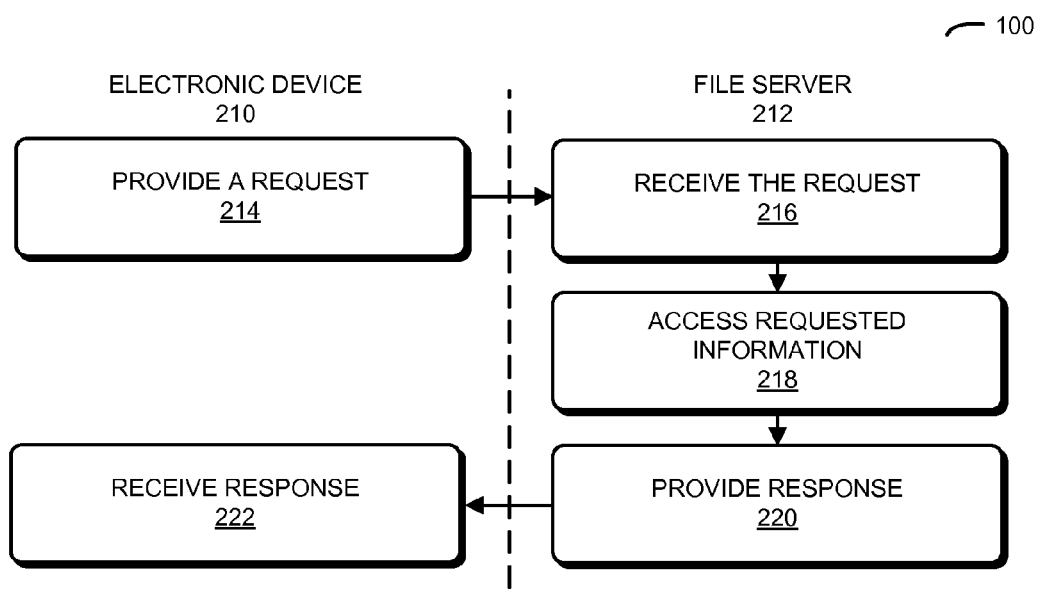
FIG. 2 is a flow diagram illustrating the method of FIG. 1 in accordance with described embodiments.

In an exemplary embodiment, the network protocol is implemented using an electronic device (such as a computer and/or a server) and at least one file server, which communicate through a network, such as the Internet (e.g., using a client-server architecture). This is illustrated in FIG. 2, which presents a flow chart illustrating method 100 (FIG. 1). During this method, a user of electronic device 210 provides the request (operation 214) for the information associated with the set of content items. Then, file server 212 receives the request (operation 216).

In response to the request, file server 212 may access requested information (operation 218), such as maximal access information and the finder information for each content item in the set of content items in the directory. Next, file server 212 may provide the response (operation 220), which is received by electronic device 210 (operation 222).

In some embodiments of method 100 (FIGS. 1 and 2), there may be additional or fewer operations. Moreover, the order of the operations may be changed, and/or two or more operations may be combined into a single operation.

In an exemplary embodiment, the network protocol facilitates simulation of a remote file system on a local computer or server (which is sometimes referred to as a 'client'). The SMB 2.x protocol simulates the New Technology File System (NTFS). The described extension to the SMB 2.x protocol facilitates simulation of the Hierarchical File System (HFS). Thus, the network protocol may facilitate communication between: the computer (or server) executing OS X® (and, more generally, an operating system provided by Apple Inc., which is used as an illustrative example) and the file server executing Windows®, the computer executing OS X® and the file server executing OS X®, or the computer executing Windows® and the file server executing OS X®. Note that the modified SMB 2.x protocol is consistent with the SMB 2.x protocol.

The additional functionality in the modified SMB 2.x protocol may be implemented by creating a new create context with a name, such as 'AAPL,' and subcommand fields that define the payload/packet formatting for different commands so that the computer and the file server know what information they are sending and to where they are sending it. This is illustrated in Table 1, which provides pseudocode for two commands, server query and resolve identifier (or 'resolve id'). Alternatively, the additional functionality may be implemented using unique context names for each of the commands in the modified SMB 2.x protocol, or case variants on 'AAPL' may be used to specify the different commands.

TABLE 1

```
/* Define 'AAPL' Context Command Codes */
enum {
    kAAPL_SERVER_QUERY = 1,
    kAAPL_RESOLVE_ID = 2
};
```

We now describe some of the commands and the additional functionality in the network protocol. Server querying is a command sent from an OS X®-based client (and, more generally, an operating system provided by Apple Inc.) to the file server over the SMB 2.x protocol. This command tells: the file server about the operating system running on the client (e.g., the command may indicate that the operating system on the client is OS X®, some other operating system produced by Apple Inc., or some other operating system), contains information about the capabilities of the client, and requests variable information about the file server. If the file server is an OS X®-based file server, it responds with an 'AAPL' create context response. This response tells the client that the file server is OS X®-based and the response contains information about: the capabilities of the file server, share capabilities and model information. Table 2 provides pseudocode for the server querying request and reply.

TABLE 2

```
/* Server Query Request */
uint32_t command_code = kAAPL_SERVER_QUERY;
uint32_t reserved = 0;
uint64_t request_bitmap;
uint64_t client_capabilities;
/* Server Query Response */
uint32_t command_code = kAAPL_SERVER_QUERY;
uint32_t reserved = 0;
uint64_t reply_bitmap;
<reply specific data>
/* The reply data is packed in the response block in the order specified by
the reply_bitmap. */
/* Server Query request/reply bitmap */
/* Bit 0 - kAAPL_SERVER_CAPS returns uint64_t bitmap of server
capabilities */
/* Bit 1 - kAAPL_VOLUME_CAPS returns uint64_t bitmap of volume
capabilities */
/* Bit 2 - kAAPL_MODEL_INFO returns uint32_t Pad2 followed by
uint32_t length */
/* followed by the Unicode model string. The Unicode string is padded
with zeros to end */
/* on an 8 byte boundary. */
/* Define Server Query request/response bitmap */
enum {
kAAPL_SERVER_CAPS = 0x01,
kAAPL_VOLUME_CAPS = 0x02,
kAAPL_MODEL_INFO = 0x04
};
/* Define Client/Server Capabilities bitmap */
enum {
kAAPL_SUPPORTS_READ_DIR_ATTR = 0x01,
kAAPL_SUPPORTS_OSX_COPYFILE = 0x02,
kAAPL_UNIX_BASED = 0x04
};
/* Define Volume Capabilities bitmap */
enum {
kAAPL_SUPPORT_RESOLVE_ID = 0x01,
kAAPL_CASE_SENSITIVE = 0x02
};
```

As shown in Table 2, an 'AAPL' create context response includes capability information about the file server, including whether or not the file server supports an OS X®-based: client directory enumeration format (i.e., the query directory extension command) and/or copy file. (Once again, OS X® is used as an illustration in the present discussion. More generally, the file server may use another operating system that supports functionality consistent with an OS X®-based or Apple Inc. operating-system-based client directory enumeration format and/or copy file.) Moreover, the capability information tells the client whether or not the file server operating system is Unix-based. Furthermore, the capability information allows the client to know whether the share point is case sensitive or not. It allows the client to know whether finding an item on the file server using just its file identifier (i.e., resolve identifier or 'resolve id') is supported or not. Additionally, the 'AAPL' create context response includes model information about the file server that allows the client to display specific human-interface elements related to that model. Note that the 'AAPL' create context response implies that the file server supports server message notifications via the SMB 2.x protocol change notification.

During directory enumerations using query directory, the FILE_ID_BOTH_DIR_INFORMATION file information class may be used. In the FILE_ID_BOTH_DIR_INFORMATION, the reply fields are defined as shown in Table 3. Moreover, if the file server replies with an 'AAPL' create context, then the FILE_ID_BOTH_DIR_INFORMATION reply fields may be defined as shown in Table 4.

TABLE 3

```
uint32_t ea_size;
uint8_t short_name_len;
uint8_t reserved;
uint8_t short_name[24];
uint16_t reserved2;
```

TABLE 4

```
uint32_t max_access;
uint8_t short_name_len = 0;
uint8_t reserved = 0;
uint64_t rsrc_fork_len;
uint8_t compressed_finder_info[16];
uint16_t reserved2;
```

The compressed_finder_info[16] may contain only fields of the finder information and the extended finder information that is used by the Apple Inc. operating system, such as OS X®. The client may build the finder information and the extended finder information using the compressed_finder_info and may fill in the remaining fields with zeros. If the content item is a folder, then the finder information and the extended finder information for a folder may be used. Otherwise, the file definitions may be used. Definitions for the uncompressed finder information and the extended finder information are shown in Table 5. By redefining FILE_ID_BOTH_DIR_INFORMATION, the directory enumeration may have fewer request/response exchanges over the network, thereby improving enumeration performance.

TABLE 5

```
struct finder_file_info {
    uint32_t finder_type;
    uint32_t finder_creator;
    uint16_t finder_flags;
    uint32_t finder_old_location = 0;
    uint16_t reserved = 0;
    uint32_t reserved2 = 0;
    uint32_t finder_date_added;
    uint16_t finder_ext_flags;
    uint16_t reserved3 = 0;
    uint32_t reserved4 = 0;
}
struct finder_folder_info {
    uint64_t reserved1;
    uint16_t finder_flags;
    uint32_t finder_old_location = 0;
    uint16_t finder_old_view_flags = 0;
    uint32_t finder_old_scroll_position = 0;
    uint32_t finder_date_added;
    uint16_t finder_ext_flags;
    uint16_t reserved3 = 0;
```

TABLE 5-continued

```
    uint32_t reserved4 = 0;
}
/* The compressed_finder_info[16] is defined as: */
struct smb_finder_file_info {
    uint32_t finder_type;
    uint32_t finder_creator;
    uint16_t finder_flags;
    uint16_t finder_ext_flags;
    uint32_t finder_date_added;
}
struct smb_finder_folder_info {
    uint64_t reserved1;
    uint16_t finder_flags;
    uint16_t finder_ext_flags;
    uint32_t finder_date_added;
}
```

Resolve identifier (which is sometimes referred to as 'resolve id') is supported if, in the 'AAPL' create context response, in the share capability information, the file server indicates that it supports resolve id. This command is sent from the OS X®-based client to the file server over the SMB 2.x protocol and contains the file identifier or 'file id' (which was generated by the file server) to be resolved (as opposed to specifying a particular directory). When the file server receives the resolve id command, it searches that share point for the content item that matches that unique file id. If the content item is found, then the file server returns the path to the content item starting from the root of the share point. (This path may be dynamically updated as the content item is moved on the file server.) However, if the file server encounters an error trying to find the content item, then this error is returned in the resolve_id_ntstatus. The resolve id request and response are defined as shown in Table 6. Because the searching is performed on the file server side, resolve id can greatly increase the speed in locating content items on the file server.

TABLE 6

```
/* Resolve ID Request */
uint32_t command_code = kAAPL_RESOLVE_ID;
uint32_t reserved = 0;
uint64_t file_id;
/* Resolve ID Response */
uint32_t command_code = kAAPL_RESOLVE_ID;
uint32_t reserved = 0;
uint32_t resolve_id_ntstatus;
uint32_t path_string_len = variable;
char * path_string;
```

As noted previously, the 'AAPL' create context response contains capability information about the file server that allows the client and the file server to know whether or not an OS X®-style copy file is supported. If an OS X®-style copy is not supported, then copy file is implemented as described in the SMB 2.x protocol. However, if an OS X®-style copy file is supported, then more of the copy-file command is performed by the file server as compared with a Windows®-style copy-file command. In particular, for an OS X®-style copy file, the client creates the target file and then tells the file server to initiate the copy file. In response, the file server locally copies the data streams, alternative data streams, and metadata (including setting privileges for the new file) associated with the file. Then, the client closes the source and target files and the copy is complete.

For an OS X®-style copy file, the source file is opened first, and then the destination file is created on the file server. The client then sends IOCTL with FSCTL_SRV_REQUES-T_RESUME_KEY and the file identifier of the source file to get a source key. Next, the client sends the IOCTL to the file server with FSCTL_SRV_COPYCHUNK, and with: the source key set to the key returned by the server, chunk count set to 0, reserved set to 0 and no chunks in the request. In response, the file server performs the OS X®-style copy file from the source file to the destination file. Once the copy is finished, the server sends the IOCTL reply indicating whether or not the copy file succeeded. Next, the client returns the error code and the copy file command is complete. In this way, the client may efficiently instruct the file server to make a duplicate copy of a file on the file server without a round-trip to the client or piecewise copying.

The implementation described here may solve the problem of correctly copying all file-related data on the source file to the duplicated file, even data that may be hidden from the client. For example, setting the access privileges correctly for the newly copied file that is created can be problematic. With client/server setups, it is typical that the server presents the client with a temporary set of access privileges that is based on the actual access privileges for the source file. This approach is typically used when the client and the file server do not share common network-based directory services. For example, the source file may be owned on the file server by 'server_local,' which has the identifier 1021 on the file server. In the case where the client and the file server do not share a common network-based directory service, identifier 1021 on the client may not even exist. The only user on the client may be identifier 501 with the name of 'client_local.' The file server may grant access to the file to be copied to the client, but the client may be shown a temporary access showing the file is owned by the client 'client_local' with identifier 501. Without the OS X®-style copy file, the client may try to set the newly created duplicate file to have the wrong owner of 'client_local' with identifier 501. With the OS X®-style copy file, the file server sets the correct owner of 'server_local' with identifier 1021. Because the file server is doing the entire copy operation in the OS X®-style copy file, any data which is hidden from the client can be correctly copied by the file server.

The current SMB 2.x protocol has no capability to inform a client that the file-server status is changing or that a pending status change has been cancelled. Server messages allow the file server to notify the client that the file server is going to be shut down in a certain number of minutes. This allows the client to display appropriate information using human-interface elements. A server message also has the capability to send another message indicating that the file server has cancelled the pending shutdown. Server messages may be implemented using the SMB 2.x protocol change notify mechanism, but by defining new values to be used, so that the change notify mechanism can be used to send messages instead. In particular, the client may send a server message change notification request with: flags set to 0, output buffer length set to 64 KB, file identifier set to −1 to inform the file server that this is a special server message change notification, and the completion filter set with the bits set to 0xfff (which provides another indication that this is a special server-message change notification). When the file server receives this change notification, it detects that the file identifier is set to −1 and that the completion filter is set to 0xfff. In response, the file server saves the change notification separately, and sends a reply to the change notification if the file server is shutting down (e.g., in 10 minutes) or if the file server is canceling a previous server shutdown notification. Moreover, if the file server is shutting down, the change notification reply is sent with one FILE_NOTIFY_INFORMATION structure in the buffer. Note that the FILE_NOTIFY_INFORMATION may have the file name set to 'com.apple.svrmsg', and the action field may be set to FILE_ACTION_REMOVED. In this structure, the number of minutes until the file server shuts down is in the uint32_t following the file name.

Next, the client sends another server message change notification request formatted as previously described. Furthermore, the client may display appropriate information in one or more human-interface elements and/or may take appropriate action (e.g., the user can log out, save files, etc.). If the file server cancels the pending shutdown, then it may send a reply to the change notification with the same formatting as previously described except that the action will now be FILE_ACTION_ADDED and there is no uint32_t following the file name. Upon receipt of this file server message change notification reply, the client may display appropriate information in one or more human-interface elements and may take appropriate action.

Figure 3:
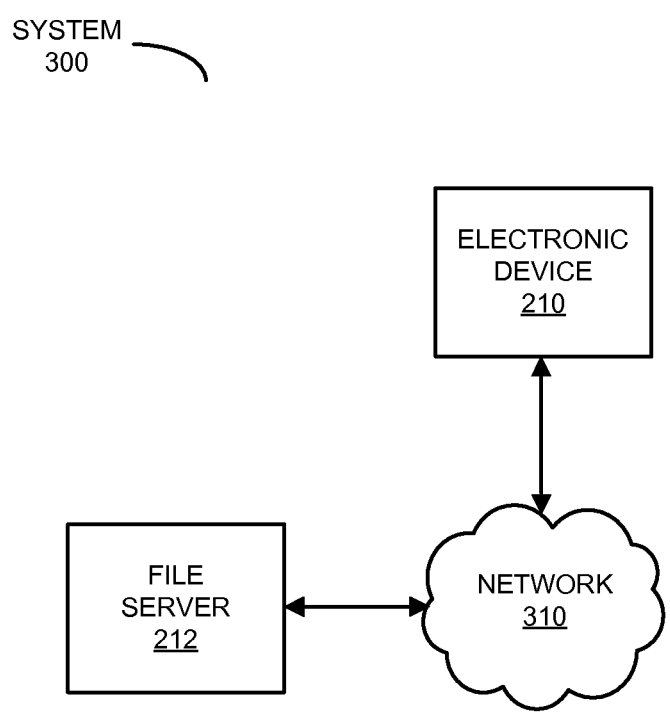
FIG. 3 is a block diagram illustrating a system in accordance with described embodiments.

We now describe embodiments of a system and an electronic device, and their use. FIG. 3 presents a block diagram illustrating a system 300 that performs method 100 (FIGS. 1 and 2). In this system, a user of electronic device 210 may use a software product, such as a software application that is resident on and that executes on electronic device 210.

Alternatively, the user may interact with a web page that is provided by file server 212 via network 310, and which is rendered by a web browser on electronic device 210. For example, at least a portion of the software application may be an application tool that is embedded in the web page, and which executes in a virtual environment of the web browser. Thus, the application tool may be provided to the user via a client-server architecture.

The software application operated by the user may be a standalone application or a portion of another application that is resident on and which executes on electronic device 210 (such as a software application that is provided by server 212 or that is installed and which executes on electronic device 210).

As discussed previously, the user of electronic device 210 may provide the request for the information associated with the set of content items via network 310. In response to receiving the request, file server 212 may access requested information, such as maximal access information and the finder information for each content item in the set of content items in the directory. Next, file server 212 may provide the response to electronic device 210 via network 310.

Note that information in system 300 may be stored at one or more locations in system 300 (i.e., locally and/or remotely). Moreover, because this data may be sensitive in nature, it may be encrypted. For example, stored data and/or data communicated via network 310 may be encrypted.

Figure 4:
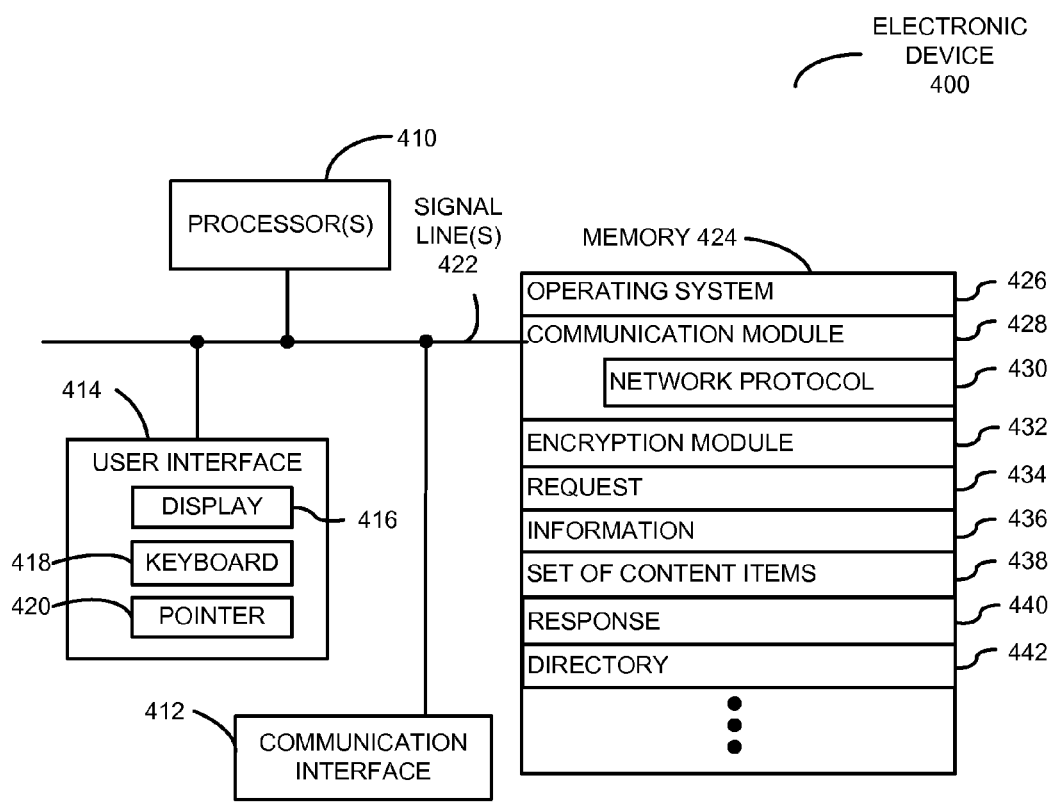
FIG. 4 is a block diagram illustrating an electronic device in the system of FIG. 3 in accordance with described embodiments.

FIG. 4 presents a block diagram illustrating an electronic device 400 (such as a computer or a server) that performs method 100 (FIGS. 1 and 2). Electronic device 400 includes one or more processing units or processors 410, a communication interface 412, a user interface 414, and one or more signal lines 422 coupling these components together. Note that the one or more processors 410 may support parallel processing and/or multi-threaded operation, the communication interface 412 may have a persistent communication connection, and the one or more signal lines 422 may constitute a communication bus. Moreover, the user interface 414 may include: a display 416 (such as a touchscreen), a keyboard 418, and/or a pointer 420, such as a mouse.

Memory 424 in electronic device 400 may include volatile memory and/or non-volatile memory. More specifically, memory 424 may include: ROM, RAM, EPROM, EEPROM, flash memory, one or more smart cards, one or more magnetic disc storage devices, and/or one or more optical storage devices. Memory 424 may store an operating system 426 that includes procedures (or a set of instructions) for handling various basic system services for performing hardware-dependent tasks. Memory 424 may also store procedures (or a set of instructions) in a communication module 428. These communication procedures may be used for communicating with one or more computers and/or servers, including computers and/or servers that are remotely located with respect to electronic device 400.

Memory 424 may also include multiple program modules (or sets of instructions), including: network protocol 430 (or a set of instructions) and/or encryption module 432 (or a set of instructions). Note that one or more of these program modules (or sets of instructions) may constitute a computer-program mechanism.

During operation of electronic device 400, network protocol 430 may provide request 434 for information 436 associated with set of content items 438 to a remote file server via communication module 428 and communication interface 412.

Subsequently, network protocol 430 may receive a response 440 with information 436 from the file server via communication interface 412 and communication module 428. For example, information 436 may include maximal access information and the finder information for each content item in set of content items 438 in a directory 442.

Note that after receiving response 440, network protocol 430 may optionally perform one or more additional operation(s), such as sending another request and/or receiving another response.

Because information in electronic device 400 may be sensitive in nature, in some embodiments at least some of the data stored in memory 424 and/or at least some of the data communicated using communication module 428 is encrypted using encryption module 432.

Instructions in the various modules in memory 424 may be implemented in: a high-level procedural language, an object-oriented programming language, and/or in an assembly or machine language. Note that the programming language may be compiled or interpreted, e.g., configurable or configured, to be executed by the one or more processors.

Although electronic device 400 is illustrated as having a number of discrete items, FIG. 4 is intended to be a functional description of the various features that may be present in electronic device 400 rather than a structural schematic of the embodiments described herein. In practice, and as recognized by those of ordinary skill in the art, the functions of electronic device 400 may be distributed over multiple servers or computers, with various groups of the servers or computers performing particular subsets of the functions. In some embodiments, some or all of the functionality of electronic device 400 is implemented in one or more application-specific integrated circuits (ASICs) and/or one or more digital signal processors (DSPs).

Electronic devices (such as electronic device 400), as well as computers and servers in system 300 (FIG. 3) may include one of a variety of devices capable of manipulating computer-readable data or communicating such data between two or more computing systems over a network, including: a personal or desktop computer, a laptop computer, a mainframe computer, a portable electronic device, a smartphone, a cellular phone, a personal digital assistant (PDA), a server, a client computer (in a client-server architecture), a media player (such as an MP3 player), an appliance, a subnotebook/netbook, a tablet computer, a piece of testing equipment, a network appliance, a set-top box, a toy, a controller, a digital signal processor, a game console, a computational engine within an appliance, a consumer-electronic device, a personal organizer, and/or another electronic device. Moreover, network 310 (FIG. 3) may include: the Internet, World Wide Web (WWW), an intranet, a cellular-telephone network, LAN, WAN, MAN, or a combination of networks, or other technology enabling communication between computing systems.

System 300 (FIG. 3) and/or electronic device 400 may include fewer components or additional components. Moreover, two or more components may be combined into a single component, and/or a position of one or more components may be changed. In some embodiments, the functionality of system 300 (FIG. 3) and/or electronic device 400 may be implemented more in hardware and less in software, or less in hardware and more in software, as is known in the art.

While the preceding discussion of the network protocol was illustrated using particular modifications to the SMB 2.x protocol, a variety of techniques may be used to implement the network protocol. For example, the SMB 2.x IOCTL request/response may be used with a new definition for at least some of the CtlCodes to contain the necessary information. Alternatively or additionally, new commands may be defined in the SMB 2.x protocol, including the desired request and response definition. On the other hand, a new SMB 2.x protocol pipe may be created to send the desired requests and responses.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic-device-implemented method for enumerating a directory that includes a set of content items located in an other electronic device, wherein the method comprises:
   providing, by the electronic device, a request for information associated with the set of content items to the other electronic device; and
   receiving a response from the other electronic device with access information and finder information for each content item in the set of content items in the directory, wherein the access information summarizes access rights and privileges of a user logged in to the other electronic device and the finder information specifies a hierarchical arrangement of the set of content items in the directory;
   wherein providing the request comprises providing a single instance of a request to the other electronic device, and
   wherein receiving the response involves receiving a single instance of a response from the other electronic device.

2. The method of claim 1, wherein the request is a compound request that includes a create request, a query information request and a close request.

3. The method of claim 1, wherein the set of content items includes a file and the response includes a resource fork logical length associated with the file.

4. The method of claim 3, wherein the resource fork logical length is conveyed in file-identifier-both-directory-information reply fields.

5. The method of claim 1, wherein the content item includes a folder.

6. The method of claim 1, wherein the electronic device uses a first operating system and the other electronic device uses a second operating system, and wherein the first operating system is different than the second operating system.

7. The method of claim 1, wherein the finder information is conveyed in file-identifier-both-directory-information reply fields.

8. A computer-program product for use in conjunction with an electronic device, the computer-program product comprising a non-transitory computer-readable storage medium and a computer-program mechanism embedded therein, to enumerate a directory that includes a set of content items located in an other electronic device, the computer-program mechanism including:
   instructions for providing a request for information associated with the set of content items to the other electronic device; and
   instructions for receiving a response from the other electronic device with information specifying each of the content items in the set of content items in the directory, wherein the information summarizes access rights and privileges of a user logged in to the other electronic device and specifies a hierarchical arrangement of the set of content items in the directory;
   wherein providing the request involves providing a single instance of a request to the other electronic device, and
   wherein receiving the response involves receiving a single instance of a response from the other electronic device.

9. The computer-program product of claim 8, wherein the received information includes maximal access information and finder information for the set of content items; and wherein the maximal access information summarizes the access rights and the privileges of the user and the finder information specifies the hierarchical arrangement of the set of content items in the directory.

10. The computer-program product of claim 9, wherein the finder information is conveyed in file-identifier-both-directory-information reply fields.

11. The computer-program product of claim 8, wherein the request is a compound request that includes a create request, a query information request and a close request.

12. The computer-program product of claim 8, wherein the set of content items includes a file and the response includes a resource fork logical length associated with the file.

13. The computer-program product of claim 8, wherein the content item includes a folder.

14. The computer-program product of claim 8, wherein the electronic device uses a first operating system and the other electronic device uses a second operating system, and wherein the first operating system is different than the second operating system.

15. An electronic device, comprising:
an interface circuit configured to communicate with an other electronic device using a connection;
a processor; and
memory, wherein the memory stores a program module, and wherein the program module is configured to be executed by the processor to facilitate enumerating a directory that includes a set of content items located in the other electronic device, the program module including:
  instructions for providing a request for information associated with the set of content items to the other electronic device; and
  instructions for receiving a response from the other electronic device with access information and finder information for each content item the set of content items in the directory, wherein the access information summarizes access rights and privileges of a user logged in to the other electronic device and the finder information specifies a hierarchical arrangement of the set of content items in the directory;
  wherein providing the request involves providing a single instance of a request to the other electronic device, and
  wherein receiving the response involves receiving a single instance of a response from the other electronic device.

16. The electronic device of claim 15, wherein the set of content items includes a file and the response includes a resource fork logical length associated with the file.

17. The electronic device of claim 16, wherein the resource fork logical length is conveyed in file-identifier-both-directory-information reply fields.

18. The electronic device of claim 15, wherein the content item includes a folder.

19. The electronic device of claim 15, wherein the electronic device uses a first operating system and the other electronic device uses a second operating system, and wherein the first operating system is different than the second operating system.

20. The electronic device of claim 15, wherein the request is a compound request that includes a create request, a query information request and a close request.

\* \* \* \* \*